US009002557B2

(12) United States Patent
Goncalves et al.

(10) Patent No.: US 9,002,557 B2
(45) Date of Patent: Apr. 7, 2015

(54) SYSTEMS AND METHODS FOR MAINTAINING AN INDUSTRIAL LIFT TRUCK WITHIN DEFINED BOUNDS

(71) Applicants: Fernando D. Goncalves, Binghamton, NY (US); Paul P. McCabe, Binghamton, NY (US)

(72) Inventors: Fernando D. Goncalves, Binghamton, NY (US); Paul P. McCabe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 11 days.

(21) Appl. No.: 13/828,334

(22) Filed: Mar. 14, 2013

(65) Prior Publication Data

US 2014/0277871 A1 Sep. 18, 2014

(51) Int. Cl.

*B60L 9/00* (2006.01)
*B66F 9/08* (2006.01)
*B66F 17/00* (2006.01)
*B66F 9/24* (2006.01)

(52) U.S. Cl.

CPC ................ *B66F 17/003* (2013.01); *B66F 9/24* (2013.01)

(58) Field of Classification Search

USPC ............................................ 701/22; 414/635
See application file for complete search history.

(56) References Cited

U.S. PATENT DOCUMENTS

| | | | |
|---|---|---|---|
| 2,982,395 | A | 5/1961 | Rados |
| 3,031,024 | A | 4/1962 | Ulinski |
| 3,067,839 | A | 12/1962 | Gibson |
| 3,504,889 | A | 4/1970 | Wyrough |
| 3,672,634 | A | 6/1972 | Chaffin |
| 3,918,597 | A | 11/1975 | Lee |
| 4,037,739 | A | 7/1977 | Lee |
| 4,509,127 | A | 4/1985 | Yuki et al. |
| 4,530,492 | A | 7/1985 | Bork |
| 5,020,825 | A | 6/1991 | Lizell |
| 5,107,969 | A | 4/1992 | Klein et al. |
| 5,269,501 | A | 12/1993 | Liegel et al. |
| 5,289,902 | A | 3/1994 | Fujita |

(Continued)

FOREIGN PATENT DOCUMENTS

| | | | |
|---|---|---|---|
| CN | 2889874 | Y | 4/2007 |
| DE | 19641192 | | 3/1998 |

(Continued)

OTHER PUBLICATIONS

"Active Sway Control cuts picking times down to size." http://www.ethiopianreview.com/articles/120808. Dated Nov. 4, 2010.

(Continued)

*Primary Examiner* — Thomas G Black
*Assistant Examiner* — Tyler Paige
(74) *Attorney, Agent, or Firm* — Quarles & Brady LLP

(57) ABSTRACT

Systems and methods maintain a lift truck within defined bounds. A controller analyzes actual and/or predicted lift truck behavior, and based on the analyzed lift truck behavior, the controller control at least one lift truck performance parameter. The performance parameter is controlled to maintain the lift truck center of gravity within a stability map, the stability map to define a three-dimensional range of center of gravity positions that maintains lift truck stability. The performance parameter is also controlled to maintain an intended path of the lift truck within an allowable deviation map, the allowable deviation map defining a two-dimensional envelope of allowable lift truck travel deviation from the intended path of the lift truck.

20 Claims, 5 Drawing Sheets

(56) References Cited

U.S. PATENT DOCUMENTS

| | | | | |
|---|---|---|---|---|
| 5,338,015 | A | 8/1994 | Liegel et al. | |
| 5,579,859 | A | 12/1996 | Quellhorst et al. | |
| 5,628,377 | A | 5/1997 | Le Gloan | |
| 5,647,600 | A | 7/1997 | Booras | |
| 5,781,873 | A | 7/1998 | Sasaki | |
| 5,853,181 | A | 12/1998 | Booras | |
| 5,878,851 | A | 3/1999 | Carlson et al. | |
| 5,993,358 | A | 11/1999 | Gureghian et al. | |
| 6,226,558 | B1 | 5/2001 | Schneider et al. | |
| 6,236,927 | B1 | 5/2001 | Sherman | |
| 6,279,199 | B1 | 8/2001 | Plate | |
| 6,290,245 | B1 * | 9/2001 | Ishikawa et al. | 280/124.16 |
| 6,350,100 | B1 * | 2/2002 | Naruse et al. | 414/635 |
| 6,499,184 | B2 | 12/2002 | Plate | |
| 6,517,094 | B1 | 2/2003 | Kincaid | |
| 6,601,825 | B2 | 8/2003 | Bressner et al. | |
| 6,688,631 | B1 | 2/2004 | Andre | |
| 6,847,874 | B2 | 1/2005 | Stiller | |
| 7,008,166 | B1 | 3/2006 | Grimes | |
| 7,017,228 | B2 | 3/2006 | Silverstein et al. | |
| 7,070,028 | B2 | 7/2006 | Reybrouck et al. | |
| 7,073,643 | B2 | 7/2006 | Schel | |
| 7,121,372 | B2 | 10/2006 | Braud | |
| 7,243,904 | B1 | 7/2007 | Grimes | |
| 7,413,062 | B2 | 8/2008 | Vandewal | |
| 7,593,797 | B2 | 9/2009 | Izawa et al. | |
| 7,770,904 | B2 | 8/2010 | Passeri | |
| 7,896,358 | B2 | 3/2011 | Hoff | |
| 7,905,555 | B2 | 3/2011 | Huntimer | |
| 8,140,228 | B2 * | 3/2012 | McCabe et al. | 701/50 |
| 2001/0056544 | A1 * | 12/2001 | Walker | 713/200 |
| 2005/0090938 | A1 * | 4/2005 | Ranelli | 701/1 |
| 2005/0102081 | A1 * | 5/2005 | Patterson | 701/50 |
| 2006/0138733 | A1 | 6/2006 | Clauson | |
| 2006/0182578 | A1 | 8/2006 | Morton | |
| 2007/0056141 | A1 | 3/2007 | Armano et al. | |
| 2007/0231113 | A1 | 10/2007 | McGurn | |
| 2008/0006494 | A1 | 1/2008 | Vandewal | |
| 2009/0082925 | A1 | 3/2009 | Wijffels et al. | |
| 2009/0166989 | A1 | 7/2009 | Atsushi | |
| 2009/0312875 | A1 | 12/2009 | Lehtonen et al. | |
| 2010/0230913 | A1 | 9/2010 | Peterson | |
| 2011/0243699 | A1 | 10/2011 | Kleeberger et al. | |
| 2012/0101627 | A1 | 4/2012 | Lert | |

FOREIGN PATENT DOCUMENTS

| | | | | | |
|---|---|---|---|---|---|
| DE | 102004048519 | | | 3/2006 | |
| DE | 102005053264 | | | 5/2007 | |
| DE | 102008020595 | | | 10/2009 | |
| EP | 1588979 | | | 10/2005 | |
| EP | 1975114 | | | 10/2008 | |
| EP | 2022749 | | | 2/2009 | |
| EP | 2081822 | | | 7/2009 | |
| JP | 57160708 | | | 10/1982 | |
| JP | 06263145 | | | 9/1994 | |
| JP | 07315518 | | | 12/1995 | |
| JP | 09086610 | | | 3/1997 | |
| JP | 9145552 | | | 6/1997 | |
| JP | 11301233 | | | 11/1999 | |
| JP | 2000344005 | A | * | 12/2000 | B60Q 1/076 |
| JP | 2004269236 | | | 9/2004 | |
| JP | 2005254975 | A | * | 9/2005 | B60R 16/02 |
| JP | 2008081261 | | | 4/2008 | |
| WO | WO 2007081020 | A1 | * | 7/2007 | |
| WO | 2008006928 | | | 1/2008 | |

OTHER PUBLICATIONS

"Sway Control." http://www.hsmsearch.com/stories/articles/-/handling_storing/warehouse_safety/sway_control/. Dated Jun. 1, 2011.

"Rocla's new innovation brings more intelligence into warehouse trucks and improves user comfort." http://www.rocla.com/news.asp?Section=405&Item=5309. Dated 2012.

Zimmert, Nico et al. "Active Damping Control for Bending Oscillations of a Forklift Mast Using Flatness based Techniques." Journal Article. Dated Jun. 2010. American Control Conference. pp. 1538-1543.

Kullaa, Jyrki. "Active Control of a Mast Structure Using Support Excitation." European Congress on Computational Methods in Applied Sciences and Engineering. Dated Jul. 2004. pp. 1-14.

Minav, T.A. et al. "Electric energy recovery system efficiency in a hydraulic forklift." IEEE EUROCON, 2009: pp. 758-765.

Guang-zhao Cui et al. "A robust autonomous mobile forklift pallet recognition." 2nd International Asia Conference on Informatics in Control, Automation and Robotics (CAR). vol. 3, 2010: pp. 28+.

Keum-Shik Hong et al. "Navigation Function-Based Control of Multiple Wheeled Vehicles." IEEE Transactions on Industrial Electronics. vol. 58, Issue 5, 2011: pp. 1896-1906.

Hoefinghoff, J.-F. et al. "Using 3D Field Simulation for Evaluating UHF RFID Systems on Forklift Trucks." IEEE Transactions on Antennas and Propagation. vol. 59, Issue 2, 2011: pp. 689-691.

* cited by examiner

SYSTEMS AND METHODS FOR MAINTAINING AN INDUSTRIAL LIFT TRUCK WITHIN DEFINED BOUNDS

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The present invention relates to the field of industrial lift trucks, and more specifically to systems and methods for maintaining lift trucks within defined bounds.

BACKGROUND OF THE INVENTION

Lift trucks are designed in a variety of configurations to perform a variety of tasks. One problem with lift trucks is that they can oscillate or vibrate about any of the X-axis, Y-axis and Z-axis (see FIG. 1). For example, when an operator stops the truck abruptly or abruptly changes direction, or both, vibrating motion about any of the X-axis, Y-axis and Z-axis can be felt by the lift truck operator. The vibrations can be more noticeable when the lift truck's mast is vertically extended. While such vibrating motion will not tip the truck, the motion can be disconcerting to the operator. Normally an operator will slow down and allow the vibrating motion to naturally dissipate before resuming travel. These unwanted vibrations can reduce the efficiency of the operator and the overall productivity of lift truck operations.

Today's lift trucks are often performance limited in an effort to maintain acceptable dynamic behavior. These performance limitations are passive and are normally universally applied independent of the current operating condition. An example would be an algorithm to limit vehicle speed according to the elevated height. The algorithm, however, may not consider the load on the forks and therefore may be returning a sub-optimal travel speed for the lift truck, which may be quite limiting to the operator's productivity. Labor cost can be the largest component of operating costs for a lift truck.

One method for improving lift truck performance includes performing a static center-of-gravity (CG) analysis while the lift truck is at rest and limiting lift truck operating parameters accordingly (for example, maximum speed and steering angle). However, this static calibration does not dynamically account for lift truck motion, changing lift heights, or environmental factors such as the grade of a driving surface, for example.

Other methods for improving vehicle stability common in consumer automobiles include calculating vehicle CG during vehicle movement and employing an anti-lock braking system (ABS) to modify the cornering ability of the vehicle. These prior methods only consider two-dimensional vehicle movement (forward-reverse and turning) and do not account for three-dimensional CG changes of a lift truck due to load weights being lifted and lowered while the lift truck is in motion. In addition, these methods do not account for maintaining a lift truck within defined bounds and keeping the lift truck from deviating from its intended path.

If the vibrating motion of the lift truck can be mitigated or even cancelled, the lift truck would then be capable of traveling faster, providing a more comfortable ride for the operator and improving productivity.

What is needed is a lift truck configured to dynamically optimize lift truck performance by maintaining the lift truck within defined bounds and keeping the lift truck from generally deviating from its intended path.

SUMMARY OF THE INVENTION

Embodiments of the present invention overcome the drawbacks of previous methods by providing systems and methods for optimize lift truck performance by maintaining the lift truck within an allowable CG bound and maintaining the lift truck within an allowable deviation bound.

In one aspect, the present invention provides systems and methods for maintaining a lift truck within defined bounds. A sensor senses a dynamic lift truck property and provides a feedback signal corresponding to the sensed lift truck property. A controller receives the feedback signal and analyzes the feedback signal, and based on the analyzed feedback signal, the controller controls at least one lift truck performance parameter that maintains the lift truck within defined bounds. The defined bound include a three-dimensional parameter and a two-dimensional parameter.

In another aspect, the present invention provides systems and methods for controlling a lift truck behavior. A controller analyzes at least one of actual and predicted lift truck behavior, and based on the analyzed lift truck behavior, the controller controls at least one lift truck performance parameter. The performance parameter is controlled to maintain the lift truck center of gravity within a stability map, the stability map to define a three-dimensional range of center of gravity positions that maintain lift truck stability. The performance parameter is also controlled to maintain an intended path of the lift truck within an allowable deviation map, the allowable deviation map defining a two-dimensional envelope of allowable lift truck travel deviation from the intended path of the lift truck.

In yet another aspect, the present invention provides systems and methods for controlling a lift truck performance parameter. An operator input device provides a command to control at least one of steering and acceleration. A controller receives the command to control the at least one of steering and acceleration, and the controller receives a signal of operating conditions, the controller analyzes the command and the signal, and based on the analyzed command and analyzed signal, the controller controls at least one lift truck performance parameter. The performance parameter is controlled to maintain the lift truck center of gravity within a stability map, the stability map to define a three-dimensional range of center of gravity positions that maintain lift truck stability. The performance parameter is also controlled to maintain an intended lift truck path within an allowable deviation map, the allowable deviation map defining an envelope of allowable travel deviation from the intended lift truck path.

The foregoing and other objects and advantages of the invention will appear in the detailed description which follows. In the description, reference is made to the accompanying drawings which illustrate preferred embodiments.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The invention will now be described more specifically with reference to the following embodiments. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "connected" and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically. Thus, although schematics shown in the figures depict example arrangements of processing elements, additional intervening elements, devices, features, or components may be present in an actual embodiment.

The various aspects of the invention will be described in connection with optimizing performance of industrial lift trucks. That is because the features and advantages that arise due to embodiments of the invention are well suited to this purpose. Still, it should be appreciated that the various aspects of the invention can be applied to other vehicles and to achieve other objectives as well.

While the description of embodiments of the invention and the accompanying drawings generally refer to a man-up order picker style lift truck, it is to be appreciated that embodiments of the invention can be applied in any lift truck configuration to maintain the lift truck within predefined boundaries. Other vehicles that can benefit from embodiments of the invention include a reach truck, a high-lift truck, a counterbalanced truck, and a swing-reach truck, as non-limiting examples.

Figure 1:
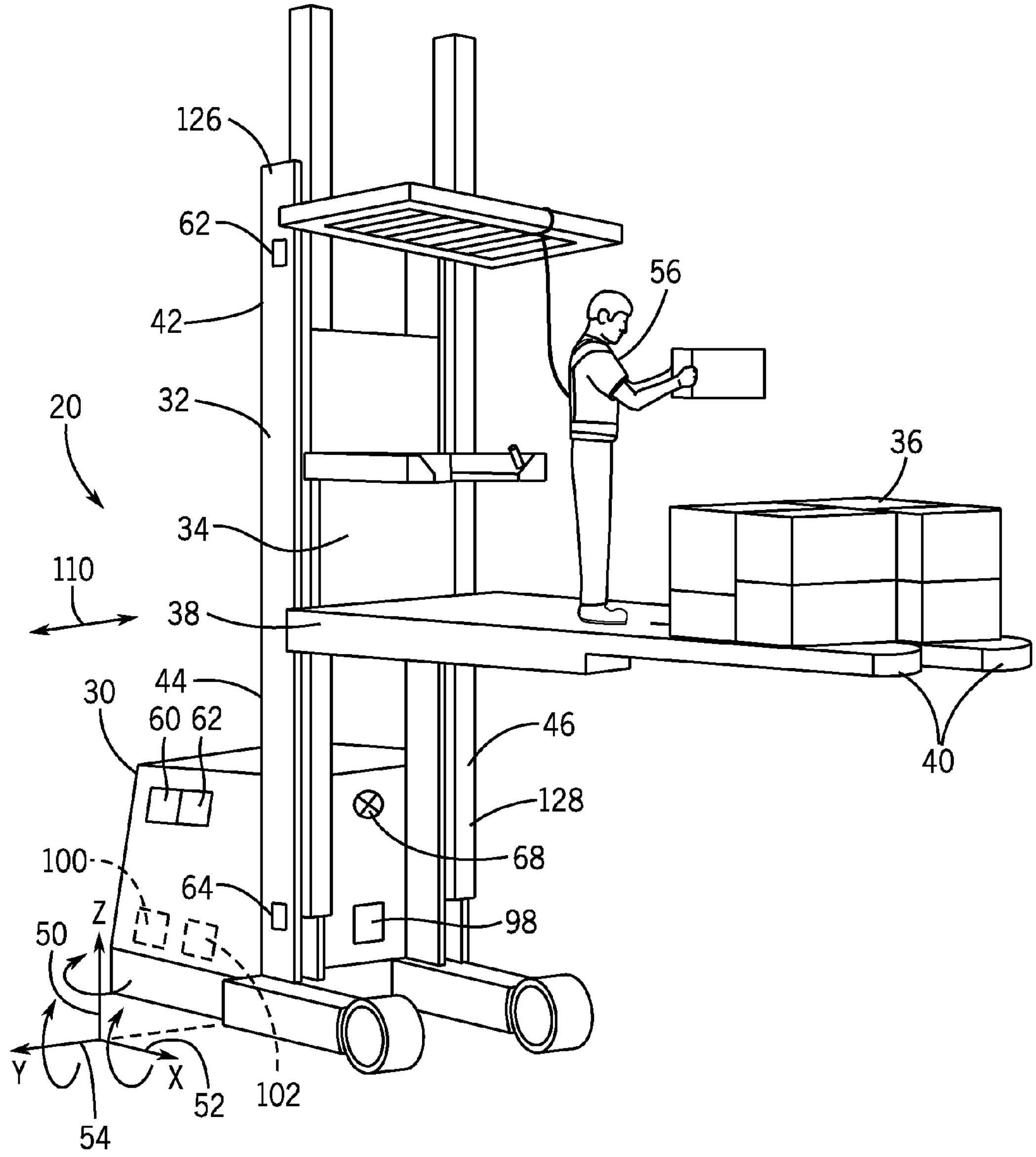
FIG. 1 is a perspective view of a lift truck showing three axes of possible vibrating motion in accordance with embodiments of the present invention.

Referring to FIG. 1, a lift truck 20 can comprise a tractor unit 30 coupled to a mast 32. The mast 32 can be vertically extendable and can include a mast carriage 34 and/or a platform 38 that can include forks 40 and that can be vertically moveable along the mast 32 to raise and lower a load 36 between an upper position 42 as shown and a lower position 44. The mast 32 can be coupled to the tractor frame 46 of the lift truck 20. FIG. 1 illustrates an exemplary man-up order picker style lift truck 20 and identifies the coordinate axes. Vibrations throughout the lift truck 20 can cause operator anxiety and lead to reduced productivity. Furthermore, in some cases, the platform 38 and/or forks 40 of the lift truck 20 can contact a rack (not shown) when vibrating torsionally. Torsional, or yaw vibrations can occur about the Z-axis 50. Roll can occur about the X-axis 52, and pitch can occur about the Y-axis 54, each of which can be felt by the operator 56 creating a sense of discomfort.

Embodiments of the invention optimize lift truck 20 performance by scrutinizing current operating conditions and dynamically determining an optimal set of lift truck performance parameters. Operating conditions can include the height of load 36, load on the forks 40, and weight of the lift truck 20, for example. The performance parameters can be those that have an impact on the dynamic behavior of the lift truck 20 and can include maximum travel speed, acceleration and deceleration rates, reach/retract speeds, reach/retract acceleration and deceleration rates, and lift speed, among others.

To arrive at the optimal lift truck performance, a controller 60 and associated control algorithm 62 can identify the current operating conditions using sensors 64 and 66, for example, and predict and/or measure the trajectory of the lift truck CG in response to an operator input. The controller 60 can then choose lift truck performance parameters that optimize performance and/or augment the operator input while maintaining the lift truck within defined bounds of the intended path. A variety of different sensors are contemplated for use with embodiments of the invention. For example, a variety of gyroscope configurations are available, such as a solid state Micro-electromechanical Systems (MEMS) gyroscope. There are also several other types of gyroscope sensors or combinations of sensors that can replace a true gyroscope. In other embodiments, differential accelerometers, such as two Z-axis accelerometers with one mounted at or near the top of the mast 126 and one at or near the base of the mast 128. Also, operating conditions can be measured by mechanical devices used as sensors. For example, compression or expansion of springs (not shown) at or near the top of the mast 126 and at or near the base of the mast 128 could be measured by any type of proximity sensor.

Figure 2:
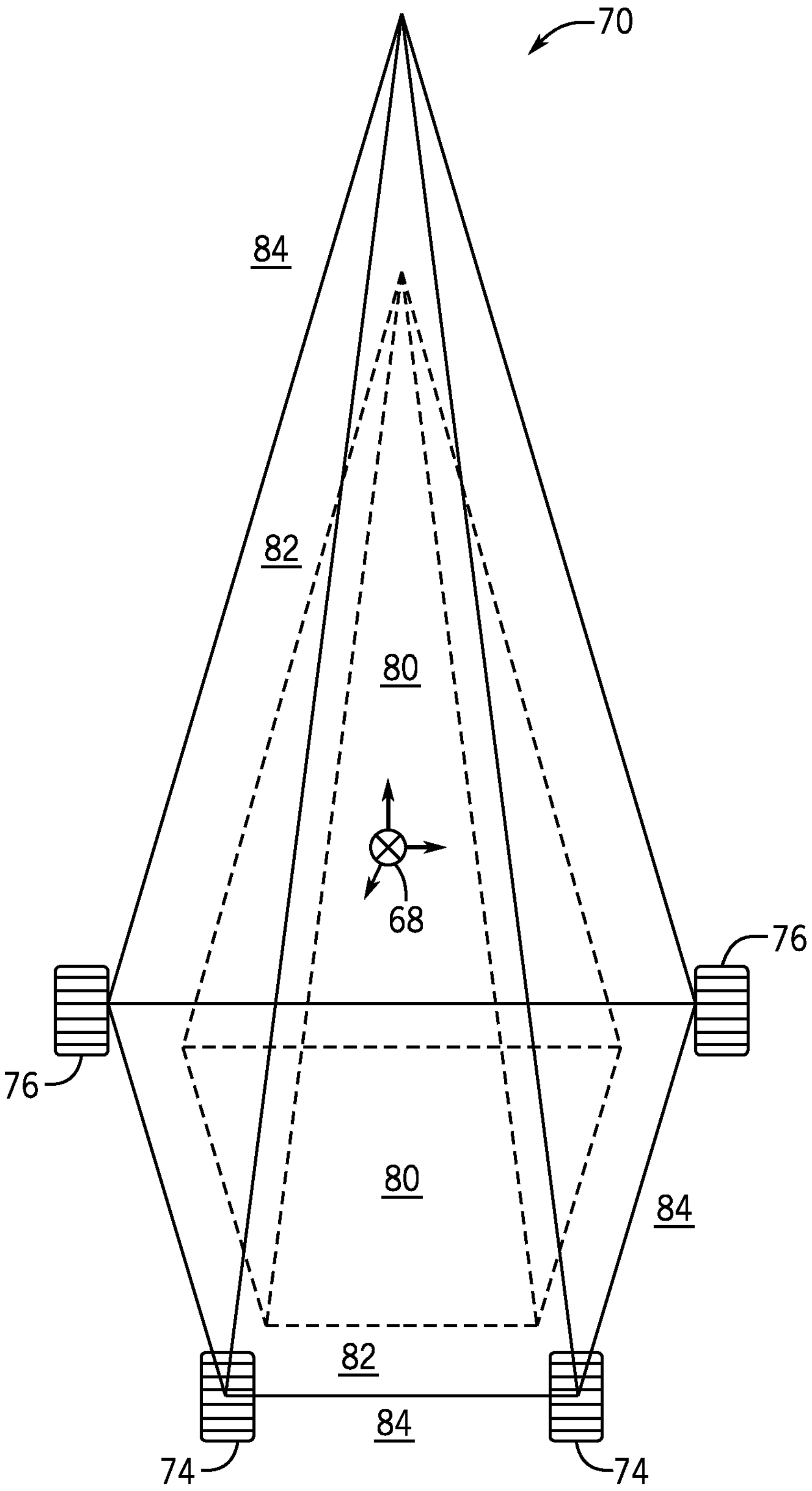
FIG. 2 is a is a schematic view showing lift truck stability in relation to CG positions and showing allowable CG bounds in accordance with embodiments of the present invention.

Referring to FIG. 2, in some embodiments, a defined bound can include a stability map 70. The stability map 70 can identify a range of potential CG positions to maintain lift truck stability. It should be noted that the stability map 70 is for a four-wheeled material handling vehicle having two turning wheels 74 and two load wheels 76. The stability map 70 can include a preferred region 80, a limited region 82, and an undesirable region 84 whose sizes are dependent on the lift truck 20 operating parameters. For example, applications requiring a high top speed may employ more stringent lift truck stability requirements and thus reduce the size of the preferred region 80. It is to be appreciated that any number of regions are contemplated, and that a definition of each region is configurable by a user using lift truck configuration software, allowing the user to control to a lesser or greater degree the stability map bounds.

Trends in measured dynamic vehicle properties, CG parameters, and wheel loads can be analyzed to predict future lift truck stability. This may be achieved, for example, by analyzing trends in the CG position 68 to determine its likelihood of entering the limited region 82 or by analyzing wheel loading trends to ensure that they remain within stable bounds. To adequately model future lift truck stability, it is contemplated that the CG parameters and wheel loads can be calculated approximately ten times per second, or more or less.

Figure 4:
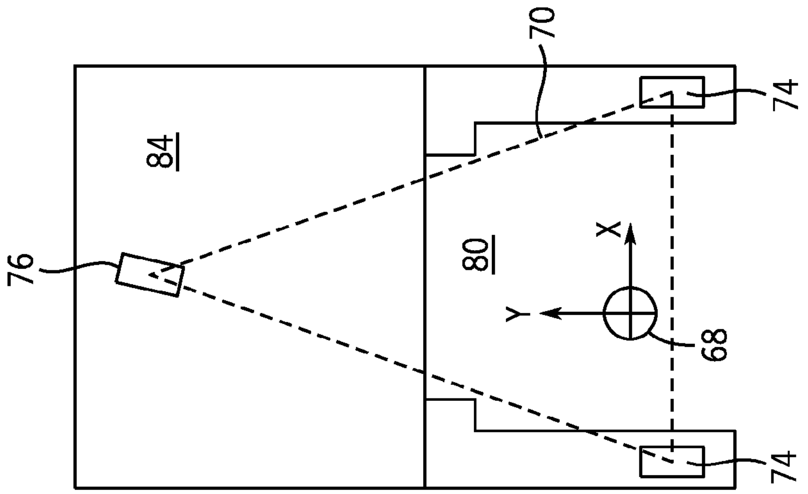
FIGS. 3 and 4 are alternative views of a three-wheeled lift truck stability in relation to center-of-gravity positions.
Figure 3:
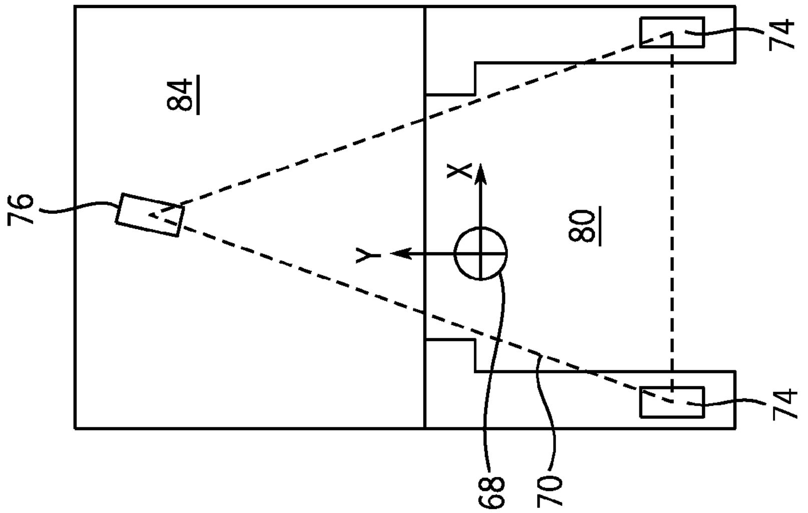

FIGS. 3 and 4 depict a three-wheeled lift truck having a triangular stability map 70 shown in two dimensional X, Y coordinates. A lift truck with more than three wheels, such as seen in FIG. 2, would result in some other polygon. FIG. 3 shows the location of the lift truck CG 68 under static conditions. FIG. 4 shows an example of how the lift truck CG 68 can move under a strong acceleration. The shift in the CG 68 position can be due to load 36 transfer and mast 32 deflection in response to the lift truck 20 acceleration.

Embodiments of the invention further aim to minimize the relative displacement between the mast carriage 34 and the tractor frame 46 in the X-axis 52 (longitudinal), Y-axis 54 (lateral), and Z-axis (torsional or yaw), as seen in FIG. 1. At high elevated heights, the mast 32 can be subject to vibrations caused by operator 56 throttle or steering requests. Floor irregularities can also contribute to these vibrations. Minor corrections to existing actuators on the lift truck 20, including a traction motor 100, a steer motor 102, a lift motor 98, and other actuators such as hydraulic actuators 104, can generate appropriate forces that can work to cancel or effectively damp these undesirable vibrations. Mitigating these undesirable vibrations further improves lift truck performance and productivity. For example, if the lift truck 20 can be accelerated in a way that does not induce vibrations, the mast 32 will not deflect as much. As such, the lift truck CG 68 can be kept further away from the undesirable region 84 of the stability map 70, thus enabling the lift truck 20 to operate at higher speeds.

Figure 5:
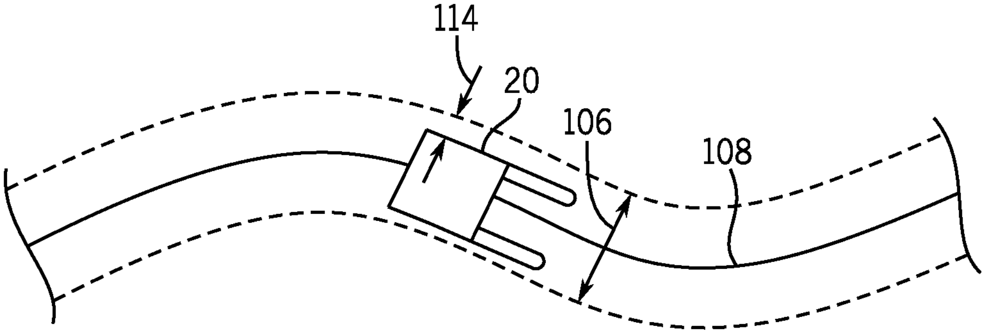
FIG. 5 is a schematic view showing lift truck stability in relation to allowable deviation bounds in accordance with embodiments of the present invention.

Referring to FIG. 5, in other embodiments, a defined bound can include an allowable deviation map 106. The allowable deviation map 106 defines an envelope of allowable travel deviation from an intended path 108 of the lift truck 20. The intended path 108 being defined by input from a user to generally steer the lift truck 20. Under most if not all circumstances, the controller 60 and control algorithm 62 can be subject to the restriction that the corrections imposed by the controller 62 on the traction motor 100 and/or steer motor 102, for example, should not cause the lift truck 20 to deviate significantly from the allowable deviation map 106, which includes the intended path 108 of the lift truck 20. Under corrections imposed by the controller 60 on inputs to the lift truck operating parameters, the lift truck 20 can be controlled to maintain the intended path 108 while staying within the allowable deviation map 106, as shown. It is to be appreciated that the allowable deviation map 106 can contain any number of regions, similar to the stability map 70, and that a definition of each region is configurable by a user using lift truck configuration software, allowing the user to control to a lesser or greater degree the allowable deviation map bounds. In some embodiments, a controllable variation 114 can be defined and configured by the user to define a distance from the lift truck 20 to the edge of the deviation map 106.

In some embodiments, the control algorithm 62 for the allowable deviation map 106 can also be applied in conditions where the operator 56 is commanding a steady-state steering input. If, during such an event, the sensors 64, 66 detect an undesirable relative torsional vibration, for example, between the carriage 34 and the tractor unit 30, the controller 60 can augment the steering input to induce a counter input 110 to damp or cancel the relative torsional vibration. The corrective counter input 110 to the steering can be small in magnitude such that it maintains the lift truck 20 within the allowable deviation map 106.

Figure 6:
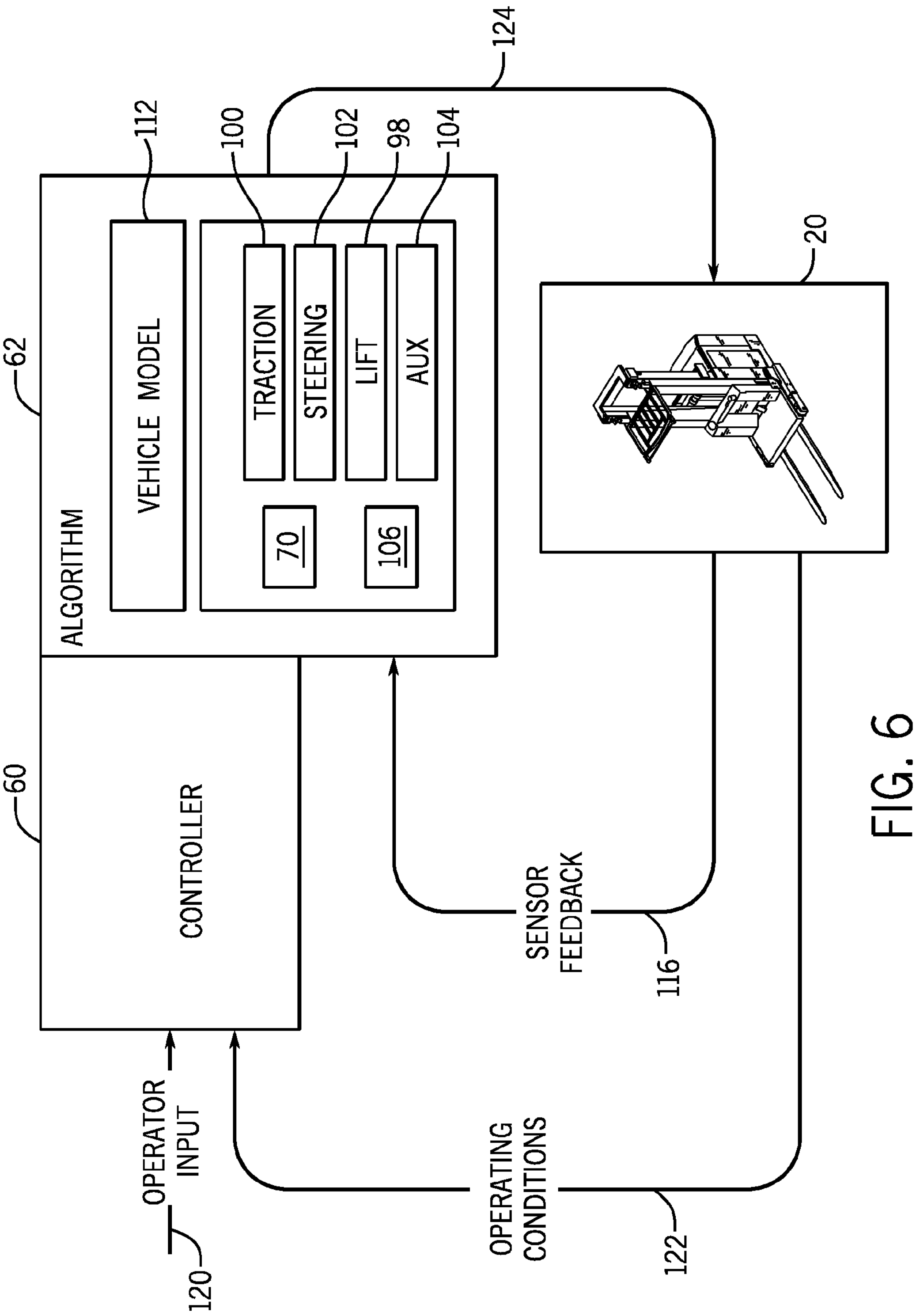
FIG. 6 is a schematic drawing of a system for controlling a lift truck to stay in bounds about the Z-axis in accordance with embodiments of the invention.

Referring to FIG. 6, the controller 60 can utilize existing actuators, e.g., the traction motor 100 and/or steer motor 102, to provide appropriate corrective forces that maintain the CG 68 within the stability map 70 and maintain the lift truck 20 within the allowable deviation map 106, while minimizing undesirable mast 32 oscillations, and establishing a set of optimal vehicle performance parameters. The control algorithm 62 can be implemented through the use of an analytical model 112 of the lift truck 20 that can accurately predict the behavior of the lift truck, or through the use of an assortment of sensor feedback 116, for example, that can measure in real-time the current state of the lift truck 20.

The controller 60 can substantially constantly monitor the operator 56 inputs 120, e.g., steering and/or acceleration, and the current operating conditions 122. The controller 60 can determine the optimal lift truck performance parameters and provide commands 124 that satisfy the operator's request while substantially simultaneously avoiding undesirable dynamic behaviors, such as mast 32 oscillation, while simultaneously maintaining the CG 68 within the stability map 70 and maintaining the lift truck 20 within the allowable deviation map 106. The controller 60 can also receive feedback from the array of sensors 64, 66 distributed throughout the lift truck 20.

With the lift truck 20 equipped with a controller 60 and associated control algorithm 62, the lift truck performance can be optimized for each operating condition 122. The performance of today's lift trucks is generally limited by the worst case operating condition. Operating factors such as vehicle speed, braking rate, turning rate, etc. can be optimized according to the operating condition. This performance optimization can be done while still preserving the lift truck CG 68 within the stability map 70 and allowable deviation map 106. Undesirable mast 32 vibrations can also be addressed by the controller 60 through the use of existing actuators on the lift truck 20. As previously described, these actuators can include the traction motor 100, the steer motor 102, the lift motor 98, and other actuators such as hydraulic actuators 104.

As described above, embodiments of the invention can create a counter moment at the lift truck level to induce counter moments at or near the base of the mast 32 that can damp or cancel vibrations at or near the top of the mast 126. It is to be appreciated that there can be other ways of achieving counter moments that have not been described here but should still be considered within the scope of the invention. For example, one such alternate can be for lift trucks that have a moveable mast, in such lift trucks, the hydraulic actuators 104 that are used to move the mast can be used to induce a counter input by commanding the actuators independently of one another in such a way that a counter moment is created. The same is true for lift trucks that have a tiltable mast. The tilt actuators can be used to induce counter moments.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. A system for maintaining a lift truck within defined bounds, the system comprising:

a sensor to sense a dynamic lift truck property and to provide a feedback signal corresponding to the sensed lift truck property;

a controller, the controller to receive the feedback signal and to analyze the feedback signal, and based on the analyzed feedback signal, the controller to control at least one lift truck performance parameter that maintains the lift truck within defined bounds, the defined bound including a three-dimensional parameter and a two-dimensional parameter, wherein the defined bound comprises an allowable deviation map, the allowable deviation map defining an envelope of allowable travel deviation from an intended lift truck path, the allowable deviation map is definable by a user.

2. The system according to claim 1, wherein the defined bound comprises a stability map, the stability map to define a three-dimensional range of center of gravity positions to maintain lift truck stability.

3. The system according to claim 1, wherein the intended lift truck path is a travel path defined by a user steering the lift truck.

4. The system according to claim 1, wherein the controller restricts any changes imposed on the at least one lift truck performance parameter to limit the lift truck from deviating from the defined bounds.

5. The system according to claim 1, wherein the at least one lift truck performance parameter is at least one of a traction motor and a steer motor and a lift motor and an actuator.

6. A system for controlling a lift truck behavior, the system comprising:

a controller, the controller to analyze at least one of actual and predicted lift truck behavior, and based on the analyzed lift truck behavior, the controller to control at least one lift truck performance parameter;

the performance parameter controlled to maintain the lift truck center of gravity within a stability map, the stability map to define a three-dimensional range of center of gravity positions that maintain lift truck stability; and the performance parameter controlled to maintain an intended path of the lift truck within an allowable deviation map, the allowable deviation map defining a two-dimensional envelope of allowable lift truck travel deviation from the intended path of the lift truck, wherein the allowable deviation map or the stability map is definable by a user.

7. The system according to claim 6, wherein the controller includes a control algorithm, the control algorithm to analyze an analytical model of the lift truck to predict the lift truck behavior.

8. The system according to claim 6, wherein the controller includes a control algorithm, the control algorithm to analyze at least one sensor feedback, the sensor feedback to provide a measure in real-time of a current state of the lift truck.

9. The system according to claim 6, wherein the controller includes a control algorithm, the control algorithm to analyze an analytical model of the lift truck to predict the lift truck behavior, and the control algorithm to analyze at least one sensor feedback, the sensor feedback to provide a measure in real-time of a current state of the lift truck.

10. The system according to claim 6, further including a sensor to sense a dynamic lift truck property and to provide a feedback signal corresponding to the sensed dynamic lift truck property.

11. The system according to claim 6, wherein the allowable deviation map is definable by the user.

12. The system according to claim 6, wherein the allowable deviation map defines a plurality of regions, the regions defining a level of acceptable lift truck travel deviation.

13. The system according to claim 6, wherein the stability map is definable by the user.

14. The system according to claim 6, wherein the stability map defines a plurality of regions, the regions defining a level of acceptable center of gravity position.

15. A system for controlling a lift truck performance parameter, the system comprising:

an operator input device, the operator input device to provide a command to control at least one of steering and acceleration;

a controller, the controller to receive the command to control the at least one of steering and acceleration, and the controller to receive a signal of operating conditions, the controller to analyze the command and the signal, and based on the analyzed command and analyzed signal, the controller to control at least one lift truck performance parameter;

the performance parameter controlled to maintain the lift truck center of gravity within a stability map, the stability map to define a three-dimensional range of center of gravity positions that maintain lift truck stability; and the performance parameter controlled to maintain an intended lift truck path within an allowable deviation map, the allowable deviation map defining an envelope of allowable travel deviation from the intended lift truck path, wherein the allowable deviation map or the stability map is definable by a user.

16. The system according to claim 15, wherein the operating conditions include at least one of a height of a load, a load on a fork, and a weight of the lift truck.

17. The system according to claim 15, wherein the performance parameter is at least one of a travel speed, acceleration and deceleration rate, reach/retract speed, reach/retract acceleration and deceleration rate, and lift speed.

18. The system according to claim 15, wherein the intended lift truck path is a travel path defined by a user steering the lift truck.

19. The system according to claim 15, further including a control algorithm, the control algorithm to analyze at least one of actual and predicted lift truck behavior, and based on the analyzed lift truck behavior, the control algorithm to control the at least one lift truck performance parameter.

20. The system according to claim 15, further including a tractor unit;

a mast mounted relative to the tractor unit, the mast including a fixed base and a vertically extendable mast section; and a vertically movable platform attached to the extendable mast section, the platform being vertically movable with the extendable mast section between an upper position and a lower position.

* * * * *